G. W. MIXTER.
HARVESTER REEL SUPPORT.
APPLICATION FILED DEC. 19, 1911.
1,117,420.
Patented Nov. 17, 1914.
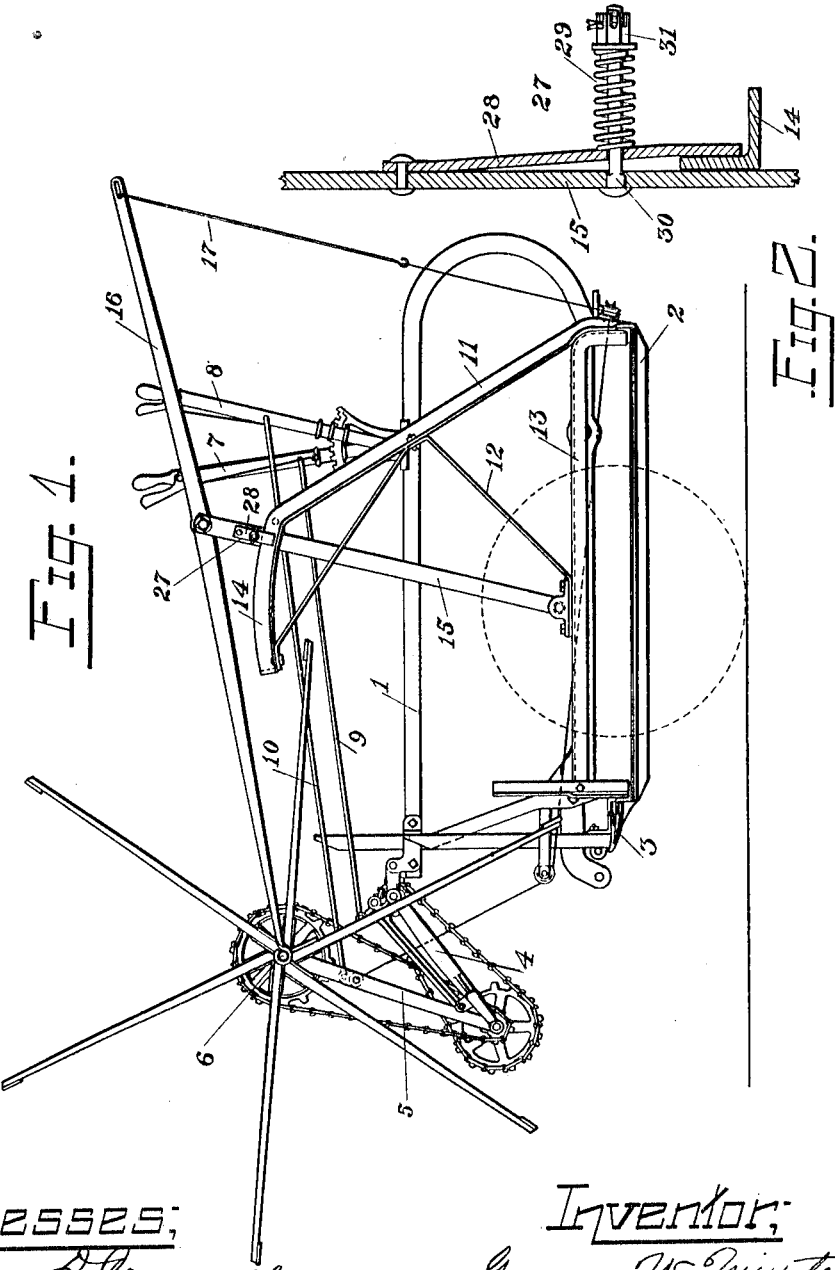
Witnesses:
Linus D. Conwell.
Anna A. Conwell.
Inventor:
George W. Mixter
by W. C. Jirdiuston
Attorney.

UNITED STATES PATENT OFFICE.

GEORGE W. MIXTER, OF MOLINE, ILLINOIS, ASSIGNOR TO DEERE & COMPANY, A CORPORATION OF ILLINOIS.

HARVESTER-REEL SUPPORT.

1,117,420. Specification of Letters Patent. Patented Nov. 17, 1914.

Application filed December 19, 1911. Serial No. 666,730.

*To all whom it may concern:*

Be it known that I, GEORGE W. MIXTER, a citizen of the United States, residing at Moline, in the county of Rock Island and State of Illinois, have invented certain new and useful Improvements in Harvester-Reel Supports, of which the following is a specification, reference being had therein to the accompanying drawing.

My invention relates to harvester-reels, and more particularly to that type of reel adapted to wide cut machines, in which the grainward end of the reel-shaft is supported in such a manner that the parallelism of the reel with the platform and cutting mechanism of the harvester is substantially preserved during the operation of adjusting the reel to any desired position.

My invention has for its object a more perfect stability of the reel when in operation, and to check any swaying movement of the grainward end.

In the accompanying drawing Figure 1 is a view in elevation of the grainward end of a harvester-platform showing my improvement, and Fig. 2 is a detailed section of my device.

Referring to the drawings, in which similar numerals indicate identical parts, 1 represents a seat supporting-pipe secured both to front and rear of the harvester-frame. 2 indicates the platform, and 3 the cutter-bar.

The reel mechanism is of a well known type and consists of a lower arm 4 horizontally journaled on the pipe 1 and the harvester-frame; the forward end of the arm 4 is bifurcated and registers with the lower end of the upper arm 5, and is pivotally connected therewith. The upper end of the arm 5 forms a dual bearing for the reel-shaft 6. The arms 4 and 5 are movable in a fore and aft as well as an upward and downward direction by means of levers 7 and 8 pivoted to a double sector mounted on the pipe 1; links 9 and 10 connect the levers 7 and 8 with the arms 4 and 5 respectively; both levers 7 and 8 are furnished with the usual latches and detents to engage with the teeth on the sector. The reel is revolved by the ordinary sprocket and chain connection with the source of power.

On the grainward end of the harvester platform 2 and at its rear end is secured a standard 11, strengthened by a brace 12 connecting the standard with a bar 13 forming part of the end of the harvester-platform 2. The standard 11 inclines forwardly, and has at its upper end a forwardly extending curved part 14, which may be of separate structure and fastened to the standard 11, or integral therewith as shown. Pivotally mounted on the bar 13 is a rocking standard 15, on the upper end of which is pivoted a lever 16, having a bearing on its forward end for the grainward end of the reel-shaft 6. A cable 17, passing over suitable sheaves on the rear of the platform, connects with the lever 16 and the arm 5, so that the lever 16 will be responsive to any movement of the mechanism supporting the stubbleward end of the reel.

By operating the lever 7 to raise the arm 4, the arm 5 is elevated, carrying with it the reel, and by means of the cable connected to the arm 5 and the rear end of the lever 16, the rear end of the latter is drawn downward and the forward end, supporting the grainward end of the reel-shaft is elevated, so that both ends of the reel are raised simultaneously; a forward movement of the lever 7 will yield the cable to an upward movement of the rear-end of the lever 16, allowing the forward-end to move downward corresponding with the movement of the arm 5.

The rocking-standard 15 is the radius of a circle of which the forwardly extending curved portion 14 of the standard 11 is an arc, and is held in close relation with the latter by a clip 27 which is secured to the rocking-standard and laps the curved portion 14 as shown. When a forward or rearward movement of the reel is desired, the lever 8 is operated to swing the arm 5, and by reason of the reel-shaft 6 being supported by the arm 5 and the pivoted standard 15 their movement is simultaneous; the clip 27 engaging with the portion 14 of standard 11, operates against any strain lateral to the movement of the standard 15. The grainward end of the reel, however, is liable to a swaying movement, when the reel is in position for operation, due to the weight of the reel and its motion, and also to the fact that no provision is made to firmly hold the standard 15 against a rocking movement during the operation of the reel. To overcome this swaying movement of the grainward end of the reel, I construct the clip 27 of a strap 28, having its upper end secured to the rocking-standard 15, and its lower end overlapping and bearing against the forwardly extending part 14 of the standard 11, the degree of pressure with which the strap 28 bears against the part 14 being maintained by a spring 29 which is carried by a bolt 30 secured to the rocking-standard 15 and extending through the strap 28, the spring 29 interposing between the strap 28 and a nut 31 on the end of the bolt 30. By using a device of this description it will be obvious that the liability of the standard 15 to rock, and the grainward end of the reel to sway, will be overcome without interfering with the movement of the standard 15 when adjusting the reel. By moving the nut 31, the pressure of the spring 29 against the strap 28 can be regulated, increasing the pressure of the latter upon the part 14 to a greater or lesser degree, as may be desired.

What I claim is—

1. In a harvester, the combination of a reel-shaft journaled in adjustable supports at its grainward and stubbleward ends, means to adjust said supports forwardly and rearwardly, a fixed standard on the platform, a clamp on the grainward support of the reel-shaft to frictionally engage with the fixed standard to prevent swaying movement of the reel-shaft after adjustment, said clamp being adjustable to vary its pressure on the fixed standard.

2. In a harvester, the combination of a reel shaft journaled in adjustable supports at its grainward and stubbleward ends, means to adjust said supports forwardly and rearwardly, a fixed standard on the platform having a forwardly extending end, and a clamp on the grainward support of the reel-shaft above the forwardly extending end of the fixed standard and in frictional engagement therewith to prevent swaying movement of the grainward end of the reel-shaft after adjustment, said clamp being adjustable to vary its pressure on the fixed standard.

In testimony whereof I affix my signature, in presence of two witnesses.

GEORGE W. MIXTER.

Witnesses:
ANNA A. CONWELL,
HARLAND E. RICH.

Copies of this patent may be obtained for five cents each, by addressing the "Commissioner of Patents, Washington, D. C."